United States Patent
Shie

(10) Patent No.: US 7,760,278 B2
(45) Date of Patent: Jul. 20, 2010

(54) LIQUID CRYSTAL DISPLAY COMPRISING A GROUND ELECTRODE AND METHOD FOR MANUFACTURING THE SAME

(75) Inventor: De-Ching Shie, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 260 days.

(21) Appl. No.: 11/974,846

(22) Filed: Oct. 16, 2007

(65) Prior Publication Data

US 2008/0088758 A1 Apr. 17, 2008

(30) Foreign Application Priority Data

Oct. 16, 2006 (TW) .............................. 95138082 A

(51) Int. Cl.
*G02F 1/1333* (2006.01)

(52) U.S. Cl. ........................ 349/40; 349/54; 349/139; 349/153; 438/30

(58) Field of Classification Search ................ 349/153, 349/190, 149, 139, 192, 40, 54, 43, 106, 349/141; 438/30; 257/E21.536
See application file for complete search history.

(56) References Cited

U.S. PATENT DOCUMENTS

| | | | |
|---|---|---|---|
| 5,760,855 A * | 6/1998 | Nakase et al. ................ | 349/40 |
| 6,108,068 A | 8/2000 | Yano et al. | |
| 6,597,414 B1 * | 7/2003 | Hasegawa .................... | 349/40 |
| 6,737,289 B2 | 5/2004 | Woo et al. | |
| 7,068,339 B2 | 6/2006 | Nakamura et al. | |
| 2006/0215102 A1 * | 9/2006 | Otose et al. ................. | 349/151 |

FOREIGN PATENT DOCUMENTS

JP   2005-202360 A   7/2005

* cited by examiner

*Primary Examiner*—Thoi V Duong
(74) *Attorney, Agent, or Firm*—Wei Te Chung

(57) ABSTRACT

An exemplary liquid crystal panel (2) has a first substrate (21); a second substrate (23) opposite to the first substrate, which includes a conductive layer formed (233) thereat; a liquid crystal layer (25) sandwiched between the first and the second substrates, and a sealant (27) provided at the peripheral region of the first substrate and the second substrate. The conductive layer is adjacent to the liquid crystal layer, which remains the peripheral region of the second substrate uncovered.

18 Claims, 4 Drawing Sheets

LIQUID CRYSTAL DISPLAY COMPRISING A GROUND ELECTRODE AND METHOD FOR MANUFACTURING THE SAME

FIELD OF THE INVENTION

The present invention relates to liquid crystal displays and method for manufacturing the same, and particularly to a liquid crystal panel preventing inner electrical elements from being damaged by the electro static, and a method for manufacturing the same.

GENERAL BACKGROUND

An LCD is capable of displaying a clear and sharp image through thousands or even millions of pixels that make up the complete image. The liquid crystal display has thus been applied to various electronic equipment in which messages or pictures need to be displayed, such as mobile phones and notebook computers. The liquid crystal display generally includes a liquid crystal panel for displaying images, and a backlight for illuminating the liquid crystal panel. The liquid crystal panel generally includes a thin film transistor (TFT) substrate, a color filter (CF) substrate, and a liquid crystal layer sandwiched between the two substrates. When a voltage is provided to the TFT substrate and the CF substrate, an electrical field is produced between the TFT substrate and the CF substrate to control the rotation of the liquid crystal molecular of the liquid crystal layer from realizing the image display.

As shown in FIG. 6 and FIG. 7, a typical liquid crystal panel 1 is shown. The liquid crystal panel 1 has a TFT substrate 11, a CF substrate 13, a liquid crystal layer 15, and a sealant 17 connecting and sealing the TFT substrate 11 and the CF substrate 13 to form an accommodating space to receive the liquid crystal layer 15. The TFT substrate 11 has a plurality of conductive metal lines 111 and a common electrode 112 formed at an inner surface thereof. The common electrode 112 is disposed at a peripheral region of the TFT substrate 11. The CF substrate 13 has a transparent conductive layer 131 formed at an inner surface thereof, which extends to an edge of the CF substrate 13 and covers the whole inner surface of the CF substrate 13. In addition, a plurality of conductive adhesive 170 is doped in the sealant 17, which electrically connect the common electrode 112 and the transparent conductive layer 131.

In operation, a voltage is provided on the TFT substrate 11 and the CF substrate 13, an electrical field is formed between the plurality of conductive metal lines III of the TFT substrate 11 and the transparent conductive layer 131 of the CF substrate 13. Liquid crystal molecular of the liquid crystal layer 15 rotates under the control of the electrical field to realize the image display.

However, the transparent conductive layer 131 extends to the edge of the CF substrate 13, and so the transparent conductive layer 131 of the CF substrate 13 can introduce the electro static into the liquid crystal panel 1, when an electro static discharge (ESD) phenomena produces. The electro static will damage the electrical elements in the liquid crystal panel 1, such as the conductive metal lines 111, driver IC (not shown), and etc.

Accordingly, what is needed is a liquid crystal panel and a method for manufacturing the same that can overcome the above-described deficiencies.

SUMMARY

In one preferred embodiment, an exemplary liquid crystal panel has a first substrate; a second substrate opposite to the first substrate, which includes a conductive layer formed thereat; a liquid crystal layer sandwiched between the first and the second substrates, and a sealant provided at the peripheral region of the first substrate and the second substrate. The conductive layer is adjacent to the liquid crystal layer, which remains the peripheral region of the second substrate uncovered.

In another preferred embodiment, an exemplary method of manufacturing a liquid crystal panel has following steps: providing a first and a second substrates; forming a conductive layer at the second substrate, which remains the peripheral region of the second substrate uncovered; attaching a sealant between the first and the second substrates to form a receiving space; and filling liquid crystal materials in the receiving space.

Other novel features and advantages will become more apparent from the following detailed description when taken in conjunction with the accompanying drawings.

DETAILED DESCRIPTION OF PREFERRED EMBODIMENTS

Figure 1:
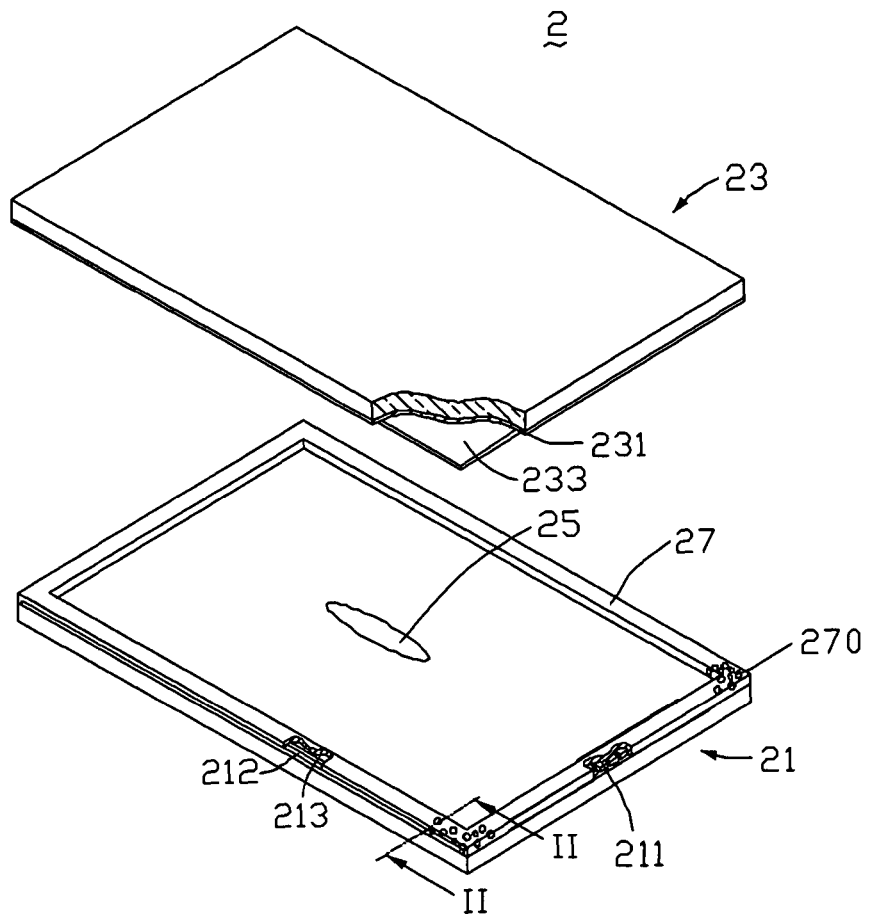
FIG. 1 is an exploded, isometric view of a liquid crystal panel according to a first embodiment of the present invention.
Figure 2:
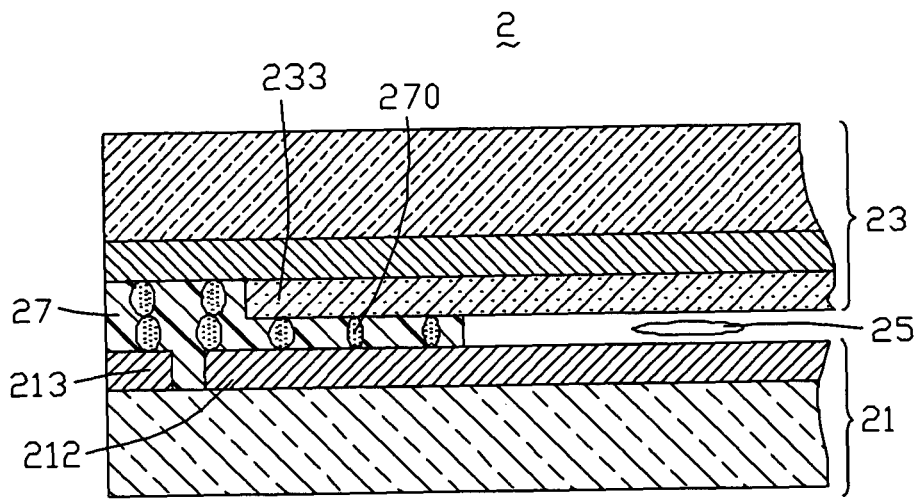
FIG. 2 is a partly, enlarged, side cross-sectional view of the liquid crystal panel of FIG. 1, corresponding to line II-II thereof.

Referring to FIGS. 1 and 2, aspects of a liquid crystal panel 2 according to a first embodiment of the present invention are shown. The liquid crystal panel 2 includes a first substrate 21, a second substrate 23, a sealant 27, and a liquid crystal layer 25. The first substrate 21 and the second substrate 23 are oriented opposite to each other. The sealant is sandwiched between the first and the second substrates 21, 23, at the peripheral region thereof, which defines an accommodating space to receive the liquid crystal layer 25 therein, cooperating with the first and the second substrates 21, 23.

The first substrate 21 is a TFT substrate, which has a plurality of metal electrodes 211, a common electrode 212 and a ground electrode 213, formed at an inner surface thereof. The common electrode 212 and the ground electrode 213 are formed at the peripheral region of the first substrate 21, which are insulated to each other through a groove (not labeled). The second substrate 23 is a color filter substrate, which has a black matrix 231 and a transparent conductive electrode 233, formed on an inner surface thereof in that order from top to bottom. The transparent conductive electrode 233 only covers a main part of the second substrate 23, and remains the peripheral region of the second substrate 23 uncovered, that is the transparent conductive electrode 233 has an area smaller than that of the first substrate 21.

A plurality of conductive adhesive particles 270 are doped in the sealant 27, which electrically connect the common electrode 212 of the first substrate 21 and the transparent conductive electrode 233 for electrically conducting the first and the second substrates 21, 23.

In assembly, the first and the second substrates 21, 23 are opposite to each other, and the sealant 27 is sandwiched therebetween, corresponding to the peripheral region of the first and the second substrates 21, 23. The sealant 27 encloses the transparent conductive electrode 233 and the common electrode 212 therein, and covers the ground electrode 213. Thus, the transparent conductive electrode 233 and the common electrode 212 are not exposed in the external atmosphere.

In operation, a voltage is provided on the first substrate 21 and the second substrate 23, an electrical field is produced between the plurality of conductive metal electrodes 211 of the first substrate 21 and the transparent conductive electrode 231 of the second substrate 23. Liquid crystal molecular of the liquid crystal layer 25 rotates under the control of the electrical field to realize the image display.

Compare to the typical liquid crystal panel 1, the transparent conductive electrode 233 of the liquid crystal panel 2 is enclosed by the sealant 27, which is not exposed in the external atmosphere. So, the electro static being introduced to the enclosed transparent conductive electrode 233 can be avoided. Therefore, the inner electrical elements can be prevented from damaging by the electro static discharging phenomena.

Figure 3:
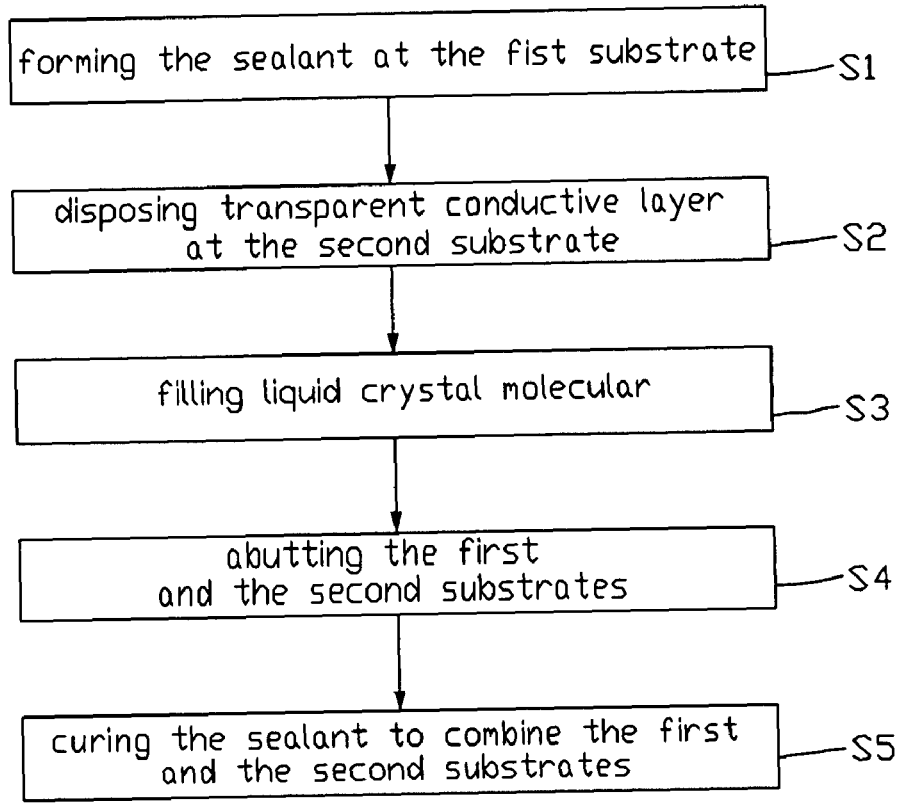
FIG. 3 is a flow chart showing a method of manufacturing the liquid crystal panel of FIG. 1.

Referring to FIG. 3, a flow chart of a method for manufacturing the liquid crystal panel 2 is shown. The method for fabricating the liquid crystal panel 2 includes the following steps.

In step S1, forming the sealant 27 at the first substrate 21, the sealant 27 is applied at a periphery region of the inner surface of the first substrate 21 through a coating method or a spreading method.

In step S2, disposing the transparent conductive layer 233 on the second substrate 23, the transparent conductive material is spread on the inner surface of the second substrate 23, and then a margin of the transparent conductive material is etched to expose the peripheral of the second substrate 23.

In step S3, filling liquid crystal molecular, the liquid crystal molecular is dropped in a space surrounded by the sealant 27 and the first substrate 21 to form the liquid crystal layer 25. After then, a plurality of spacers (not shown) can be dispersed in the liquid crystal layer 25.

In step S4, abutting the first and the second substrates, the second substrate 23 is loosely attached onto the first substrate 21, and is pressed. So, the sealant 27 fills a gap between the transparent conductive layer 233 and the peripheral region of the second substrate 23 with the peripheral region of the first substrate 21, which assures the electrical connection between the common electrode 212 of the first substrate 21 and the transparent conductive layer 233 of the second substrate 23.

In step S5, curing the sealant 27 to combine the first and the second substrates 21, 23, ultraviolet light or heat is used to cure the sealant 27 to realize the sealing of the liquid crystal panel 2.

Figure 4:
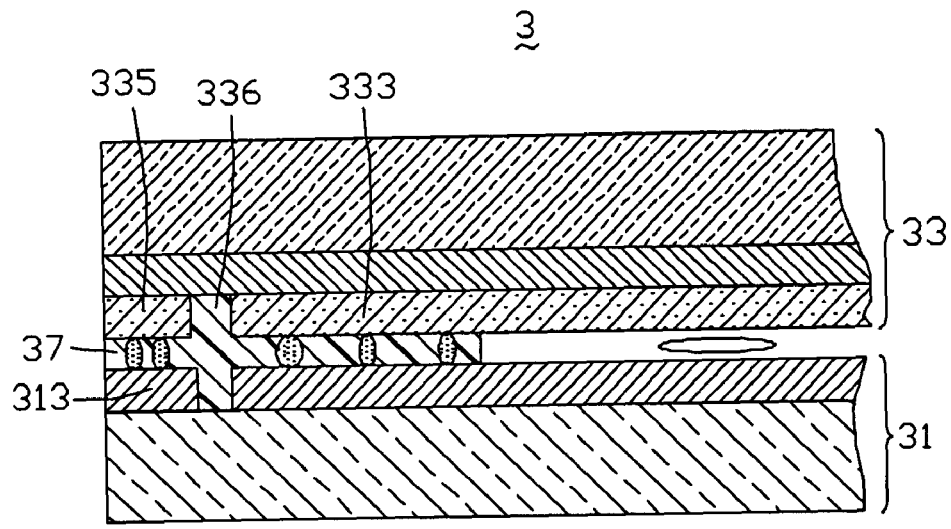
FIG. 4 is similar to FIG. 2, but essentially showing a corresponding view in the case of a liquid crystal panel according to a second embodiment of the present invention.

Further or alternative embodiments may include the following. In a second embodiment of the present invention, referring to FIG. 4, a liquid crystal panel 3 has a structure same to that of the liquid crystal panel 2 except that a transparent metal layer formed at a second substrate 33 is divided to a main part (not labeled) and a peripheral part (not labeled) surrounding the main part, by a groove 336. The main part forms a transparent conductive layer 333, and the peripheral part forms an electro static conductive layer 335, insulated with the transparent conductive layer 333. The electro static conductive layer 335 corresponds to a ground electrode 313 formed at a first substrate 31. The electro static conductive layer 335 extends to an edge of the second substrate 33. After assembly, the sealant 37 fills the groove 336 and encloses the transparent conductive layer 333 therein. Thus, the transparent conductive layer 333 is not exposed at the external atmosphere.

Figure 5:
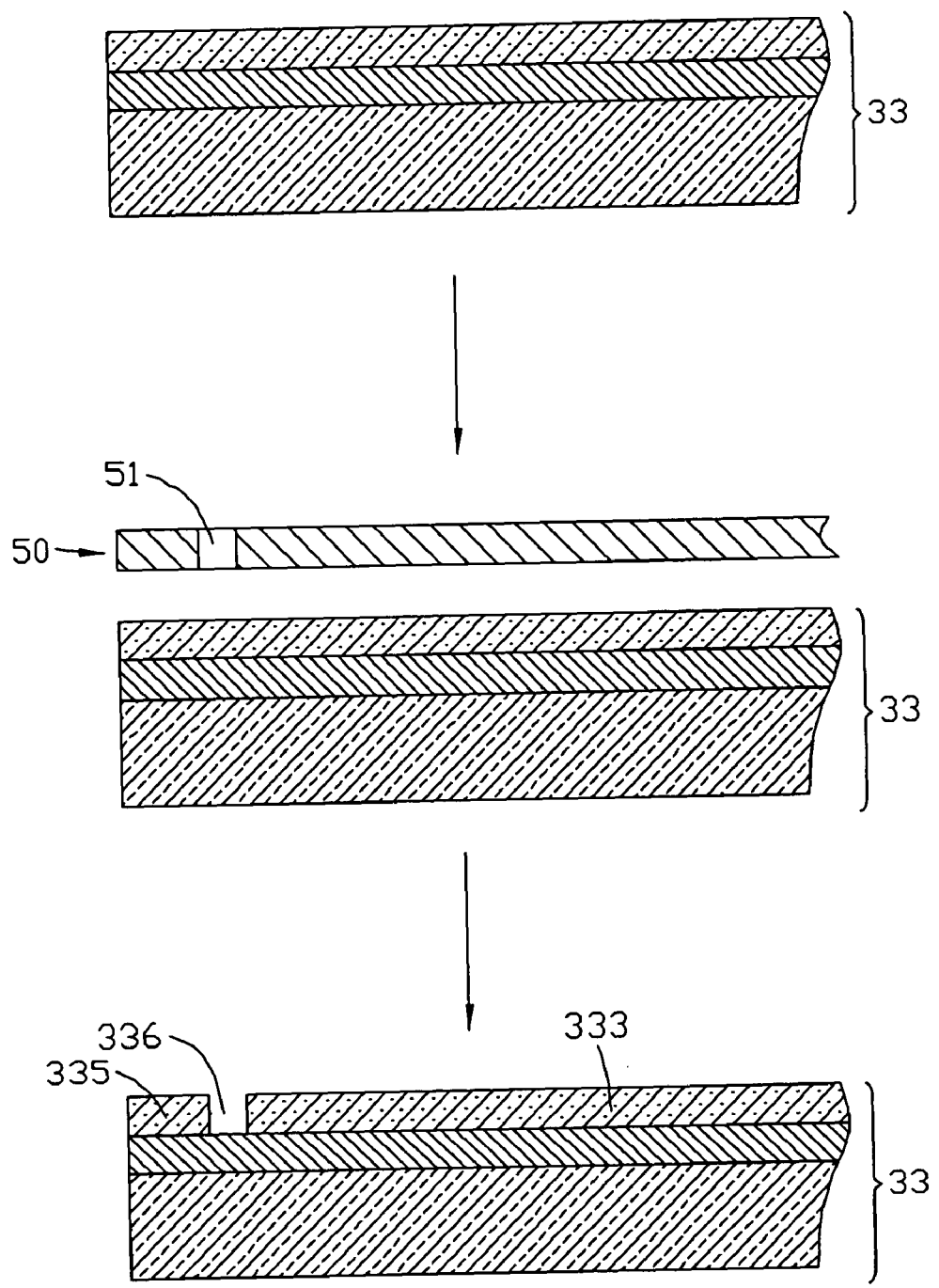
FIG. 5 shows the steps of manufacturing the liquid crystal panel of FIG. 4.
Figure 6:
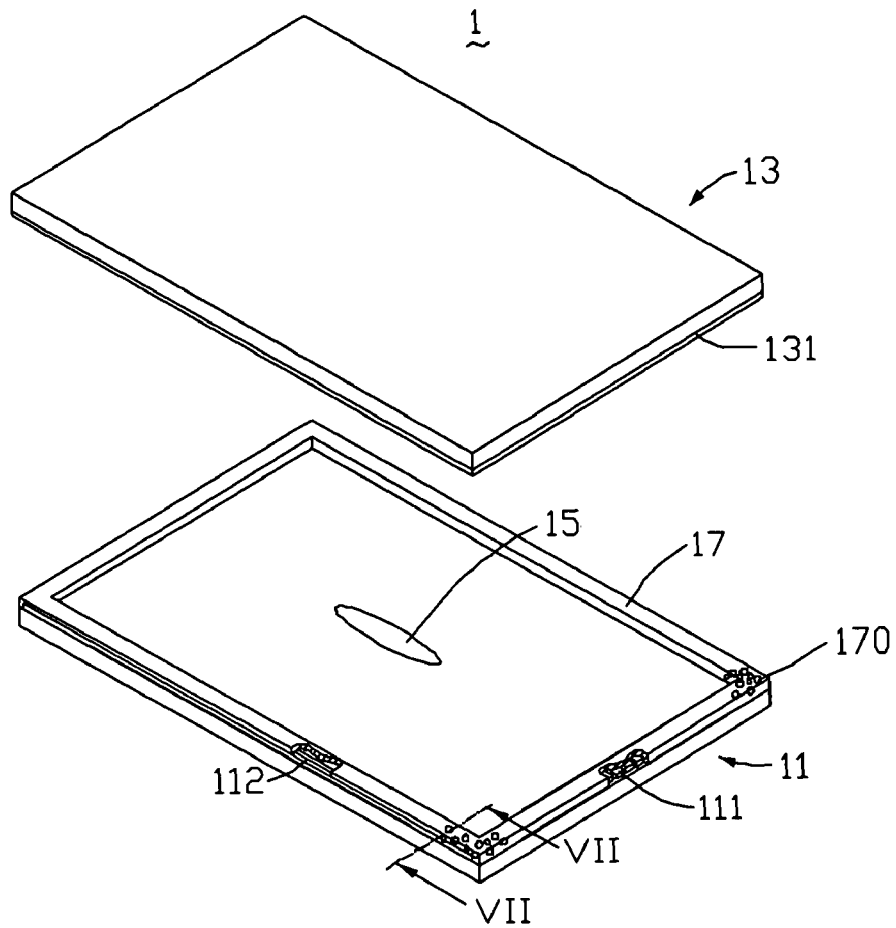
FIG. 6 is an exploded, isometric view of a conventional liquid crystal panel.
Figure 7:
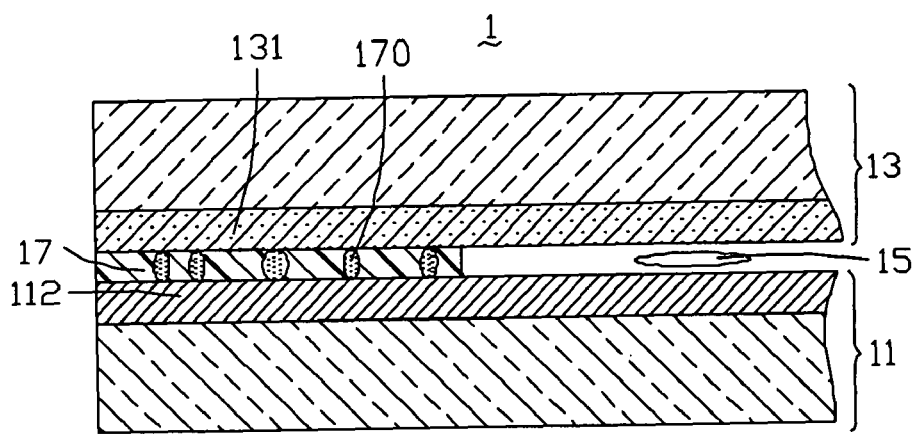
FIG. 7 is a partly, enlarged, side cross-sectional view of the liquid crystal panel shown in FIG. 6, corresponding to line VII-VII thereof.

As shown in FIG. 5, the groove 336 can be formed by a photo-mask process. A light source (not shown) and a first photo-mask 50 are used to expose the transparent metal material. The photo-mask 50 is a slit mask, which has a slit region 51 and a shielding region (not labeled). The slit region 51 of the photo-mask 50 has a higher light transmittance ratio than the shielding region. Thus, light energy exiting from the slit region 51 is higher than that exiting from the shielding region. Then the transparent metal material is developed, thereby forming the transparent metal layer having the main part (not labeled) and the peripheral part (not labeled) surrounding the main part, by the groove 336. The main part forms the transparent conductive layer 333, and the peripheral part forms the electro static conductive layer 335.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel comprising:
   a thin film transistor (TFT) substrate, which comprises a common electrode and a ground electrode;
   a color filter (CF) substrate opposite to the TFT substrate, the CF substrate comprising a conductive layer formed thereat;
   a liquid crystal layer sandwiched between the TFT and the CF substrates; and
   a sealant provided between the TFT substrate and the CF substrate at a peripheral region of the TFT substrate and the CF substrate;
   wherein the conductive layer is adjacent to the liquid crystal layer and does not cover the peripheral region of the CF substrate, the common electrode is adjacent to the liquid crystal layer, the ground electrode is formed at the peripheral region of the TFT substrate and is generally adjacent to the common electrode, the common electrode and the ground electrode are insulated from each other via a groove, and the sealant encloses the conductive layer and the common electrode therein and covers the ground electrode.

2. The liquid crystal panel as claimed in claim 1, wherein the conductive layer and the common electrode are not exposed to the external atmosphere.

3. The liquid crystal panel as claimed in claim 1, further comprising an electro static conductive layer formed on the CF substrate in the peripheral region of the CF substrate, the electro static conductive layer surrounding the conductive layer and spaced from the conductive layer.

4. The liquid crystal panel as claimed in claim 3, wherein the electro static conductive layer extends to an edge of the CF substrate.

5. The liquid crystal panel as claimed in claim 3, wherein a groove is provided between the electro static conductive layer and the conductive layer.

6. The liquid crystal panel as claimed in claim 5, wherein the sealant also fills the groove between the electro static conductive layer and the conductive layer.

7. The liquid crystal panel as claimed in claim 3, wherein the ground electrode corresponds to the electro static conductive layer.

8. The liquid crystal panel as claimed in claim 3, wherein the electro static conductive layer and the conductive layer are substantially coplanar with each other.

9. The liquid crystal panel as claimed in claim 1, wherein the ground electrode and the common electrode are substantially coplanar with each other.

10. The liquid crystal panel as claimed in claim 1, wherein the sealant also fills the groove.

11. A method of manufacturing a liquid crystal panel, the method comprising:
    providing a thin film transistor (TFT) substrate and a color filter (CF) substrate;
    forming a common electrode and a ground electrode at an inner surface of the TFT substrate, the ground electrode formed at a peripheral region of the TFT substrate, and the common electrode and the ground electrode insulated from each other via a groove;
    forming a conductive layer at the CF substrate, except at a peripheral region of the CF substrate;
    attaching a sealant between the TFT and the CF substrates at the peripheral regions thereof to form a receiving space, the sealant enclosing the conductive layer and the common electrode therein and covering the ground electrode; and
    filling liquid crystal materials in the receiving space.

12. The method as claimed in claim 11, wherein the conductive layer is coated or spread on the CF substrate.

13. The method as claimed in claim 11, further comprising a step of forming an electro static conductive layer on the CF substrate, the electro static conductive layer surrounding the conductive layer and spaced from the conductive layer.

14. The method as claimed in claim 13, wherein the electro static conductive layer extends to an edge of the CF substrate.

15. The method as claimed in claim 13, wherein the ground electrode corresponds to the electro static conductive layer.

16. The method as claimed in claim 13, wherein the electro static conductive layer and the conductive layer are substantially coplanar with each other.

17. The method as claimed in claim 11, wherein the ground electrode and the common electrode are substantially coplanar with each other.

18. The method as claimed in claim 11, wherein the sealant also fills the groove.

* * * * *